United States Patent [19]

Young

[11] Patent Number: 4,635,074

[45] Date of Patent: Jan. 6, 1987

[54] ELECTROGRAPHIC STYLUS RECORDING APPARATUS

[75] Inventor: James D. Young, Cazenovia, N.Y.

[73] Assignee: Minnesota Mining and Manufacturing Company, St. Paul, Minn.

[21] Appl. No.: 829,394

[22] Filed: Feb. 13, 1986

[51] Int. Cl.[4] .............................................. G01D 15/06

[52] U.S. Cl. ................................ 346/74.2; 346/153.1; 358/300

[58] Field of Search ............................ 346/153.1, 74.2; 358/300, 301; 400/119; 101/DIG. 13

[56] References Cited

U.S. PATENT DOCUMENTS 4,460,907 7/1984 Nelson .............................. 346/153.1

4,464,672 8/1984 Lindahl ............................ 346/153.1

*Primary Examiner*—Arthur G. Evans

*Attorney, Agent, or Firm*—Donald M. Sell; James A. Smith; Robert L. Marben

[57] ABSTRACT

An improved electrographic stylus recording apparatus wherein magnetically attractable toner powder used during imaging, but not forming a part of a toner image, is returned from one side of a stylus array to the toner powder hopper of the apparatus. The toner powder is transported around the stylus array by the use of fixed magnets disposed within two rotatable cylindrical sleeve members disposed on opposite sides of the stylus array. A further cylindrical sleeve member having a rotatable magnetic field producing means within the sleeve attracts toner powder from the cylindrical sleeve disposed on the toner powder hopper side of the stylus array for delivery to the toner powder hopper.

6 Claims, 3 Drawing Figures

ELECTROGRAPHIC STYLUS RECORDING APPARATUS

BACKGROUND OF THE INVENTION

1. Field of the Invention

The invention presented herein relates to the field of electrographic stylus recording apparatus capable of producing a toner powder image on a receptor member and, more particularly, to the structure providing for return to the toner powder hopper of the apparatus that toner powder which is presented for imaging but is not used as a part of the toner powder image.

2. Description of the Prior Art

U.S. Pat. No. 4,460,907 issued July 17, 1984 to Kerry S. Nelson discloses an electrographic magnetic stylus recording apparatus capable of producing an unfixed or nonpermanent toner powder image on a receptor belt. A stylus array is positioned adjacent to the receptor belt to provide a recording gap. Toner powder is provided to the recording gap as the receptor belt is moved. A toner powder image is formed in accordance with electrical signals selectively applied to the styli of the stylus array. Since the toner powder image that is formed is unfixed or nonpermanent, the apparatus provides for reuse of the toner powder. Toner powder that is not held on the receptor belt as a part of the toner image by an electrical charge is collected and returned by gravity to the portion of the apparatus where toner is supplied to the receptor belt for movement to the recording gap. The use of gravity as a part of the toner return or recirculation arrangement limits the configuration of an electrographic magnetic stylus recording apparatus for providing a toner powder image. Further, it is important to minimize the abrasive action to which the toner powder is subjected to lengthen the useful life of the toner powder in the case of apparatus providing an unfixed toner powder image where the toner powder is reused.

SUMMARY OF THE INVENTION

The invention presented herein avoids the disadvantages present in the prior art apparatus to provide an improved electrographic stylus recording apparatus for use with magnetically attractable toner powder which includes a receptor recording member; a stylus array spaced from the receptor recording member for providing a recording region with the receptor recording member adapted for movement past said stylus array; a hopper for holding a supply of toner powder from which toner powder is provided to the recording region; a magnetic field producing means disposed adjacent one side of the stylus array establishing a magnetic field at the first electrode to attract toner powder toward the ends of the stylii of the stylus array, the magnetic field producing means also attracting toner powder presented adjacent the recording region; a first cylindrical sleeve member of non-magnetic material disposed about the magnetic field producing means and adapted for rotation to carry toner powder attracted toward the magnetic field producing means away from said recording region; a second cylindrical sleeve member of non-magnetic material and a magnetic field producing means disposed within the second cylindrical sleeve member and adapted for rotation, the second cylindrical sleeve member positioned close to the first cylindrical sleeve member to cause the magnetic field producing means of the second cylindrical sleeve member to attract toner powder carried by the first cylindrical sleeve member to the second cylindrical sleeve member and move toner powder attracted to the second cylindrical sleeve member to at least one end portion of the second cylindrical sleeve member. The improvement resides in a toner powder transport means provided for transporting the toner powder from the one end portion of the second cylindrical sleeve member to the hopper. It includes a magnetic field producing means disposed within the first cylindrical sleeve member and opposite the one end portion of the second cylindrical sleeve member for attracting toner powder from the one end portion of the second cylindrical sleeve member to an end portion of the first cylindrical sleeve member. Rotation of the first cylindrical sleeve member carries such toner powder away from the magnetic field producing means provided opposite the end portion of the second cylindrical sleeve member and within the first cylindrical sleeve member. A third cylindrical sleeve member is included which is adapted for rotation has an end portion disposed near the end portion of the first cylindrical sleeve member with a magnetic field producing means disposed opposite the end portion of the first cylindrical sleeve member and within the third cylindrical sleeve member for attracting toner powder from the one end portion of the first cylindrical sleeve member to the end portion of the third cylindrical sleeve member. Rotation of the third cylindrical sleeve member carries toner powder attracted to its end portion away from the first cylindrical sleeve member for further movement by the toner powder transport means to the hopper.

BRIEF DESCRIPTION OF THE DRAWINGS

The present invention will be more thoroughly described with reference to the accompanying drawings, wherein like numbers refer to like parts in the several views, and wherein.

DETAILED DESCRIPTION

The electrographic stylus recording apparatus embodying the invention presented herein is one which carries out a printing or recording process which is commonly referred to as electrographic magnetic stylus recording. This process has been described in several articles, such as the one by L. W. Carlson, "Electrographic Magnetic Stylus Recording; A High speed Non-Impact Magnetic Printing Process," IEEE Transactions of Magnetics, Vol. May-17, No. 6, November 1981. Several references are listed in the article which are pertinent to the recording process. Such process is utilized in the apparatus disclosed in U.S. Pat. No. 4,460,907, supra. As in the apparatus of the Nelson patent, the apparatus embodying the present invention is used to produce nonpermanent or unfixed toner images and provides for return of toner powder to a toner powder hopper for reuse in the recording process.

Figure 1:
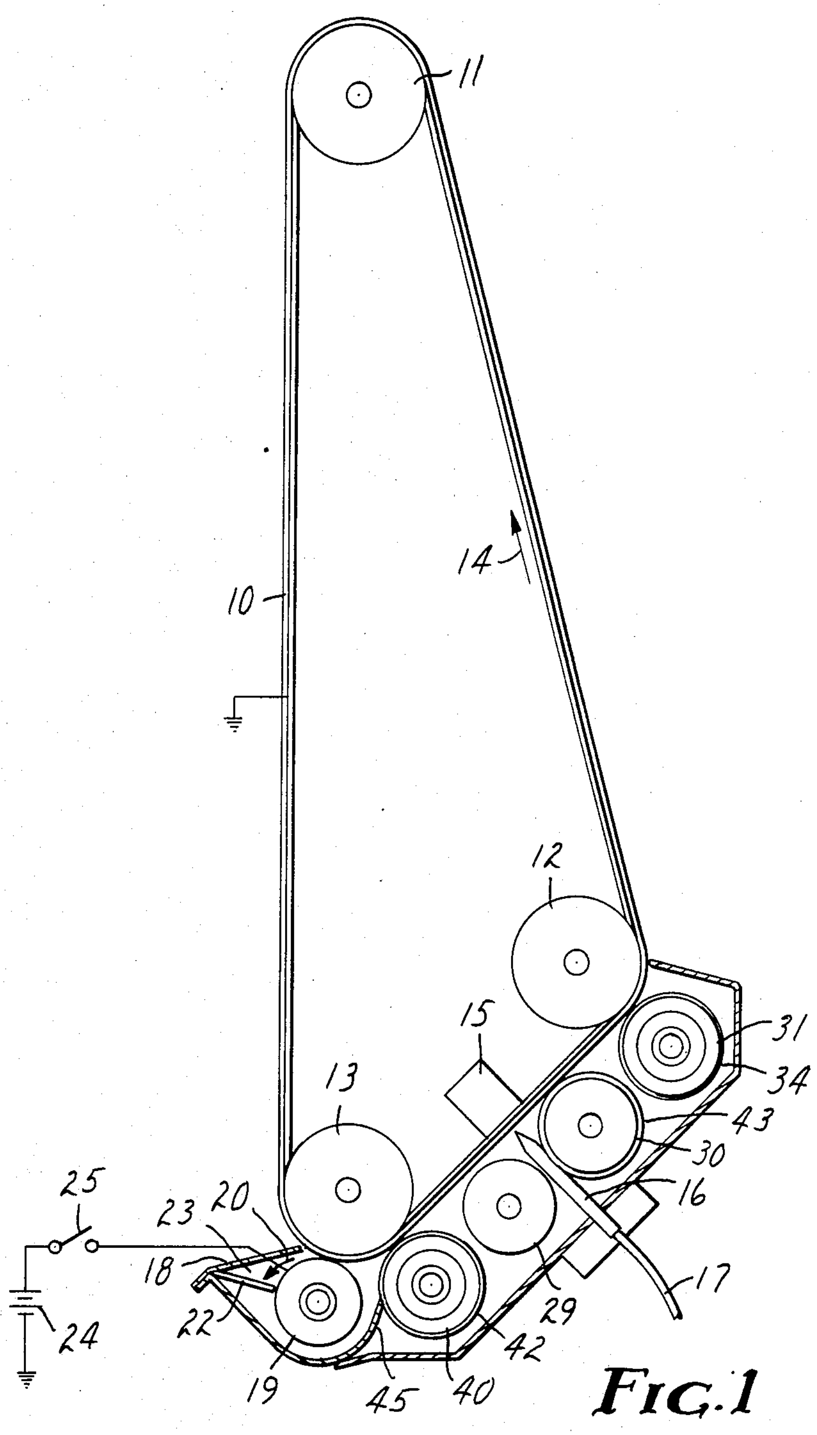
FIG. 1 is a side view of apparatus embodying the invention.

Referring to FIG. 1 of the drawing, the apparatus embodying the invention presented herein is diagrammatically shown and includes a receptor recording member 10 in the form of a flexible belt including a backing layer of a material such as polyester on which a thin dielectric layer is carried with a thin conductive layer intermediate the dielectric layer and the polyester. The conductive layer can be indium tin oxide, for example. The conductive layer of the member 10 is represented by the center line of the side view of member 10 in FIG. 1 and is connected to ground. One way for making such connection involves having the width of the dielectric layer less than the width of the conductive layer allowing the conductive layer to be contacted by a conductive brush that is connected to ground. Since a wear problem is presented, it is desirable to have the edge of the conductive layer to be contacted, covered with a coating of graphite that can be applied using a mixture of graphite and alcohol. One or more driven rolls, represented at 11–13, move and direct the receptor member in a counterclockwise direction as viewed in FIG. 1 and indicated by the arrow 14. The dielectric material is presented at the outer surface of member 10. The drive means for the driven roll(s) includes an electric motor (not shown). The inner surface of the receptor recording member making contact with the rolls 11–13 is contacted by a bar member 15 disposed intermediate the rolls 12 and 13. The bar member 15 extends the width of the receptor belt 10 and transverse to the direction of movement of the belt. The bar member 15 serves to position the dielectric layer of the receptor recording member relative to the ends of the styli of a stylus electrode array 16 positioned on the dielectric layer side of the receptor recording member 10 opposite the bar member 15. The stylus electrode array extends generally perpendicular to the receptor recording member 10 and transverse to the direction of movement of the receptor recording member. The stylus electrode array 16 includes a number of parallel conductive styli that are closely spaced and insulated from one another. Conductors indicated at 17, one for each stylus, are used for selectively applying recording electrical signals to the styli from a source (not shown). The stylus electrodes are preferably comprised of magnetic permeable material. The array 16 is positioned so one end of each stylus electrode is a relatively short distance from the receptor recording member 10 establishing a recording gap at each stylus to which toner powder is delivered. The recording gap preferably should be large enough so a plurality of toner particles, forming at least one elongate toner chain-like aggregate, can be accommodated in the gap at each stylus electrode thereby insuring a suitable electronically conductive path between the tip of each stylus electrode and the receptor recording member to cause toner particles to be held by an electrical charge to the receptor recording member 10 opposite a given stylus electrode whenever an electrical signal is applied to such stylus electrode.

Figure 2:
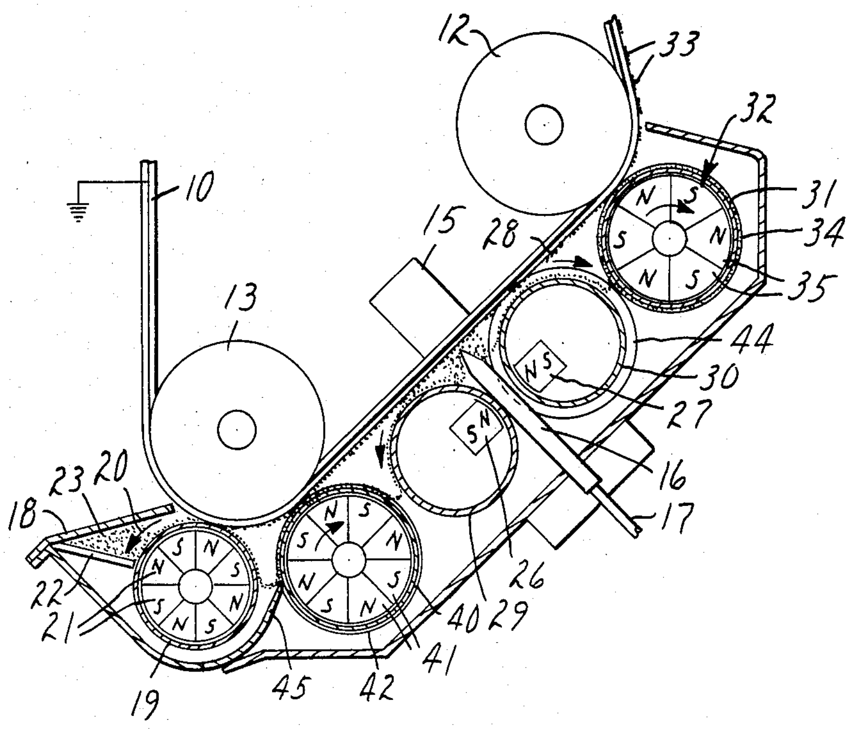
FIG. 2 is a partial side view of the apparatus as shown in FIG. 1, but with a section taken along line 2—2 of FIG. 3.

A toner powder hopper 18 is provided for receiving a supply of toner powder 23 that is magnetically attractable and of a conductivity that is suitable for electrographic magnetic stylus recording. Mounted within the hopper 18 is a toner powder applicator in the form of a cylindrical, electronically conductive sleeve 19 adapted for counterclockwise rotation as viewed in FIG. 1 and indicated by the arrow 20. The sleeve 19 is positioned with its outer surface spaced a short distance from the receptor recording member 10 and extending transversely to the direction of movement of the recording member 10. The applicator also includes a magnetic field producing means that is provided by a plurality of stationary sector shaped magnets 21 (FIG. 2) mounted within the sleeve 19 and extending axially of the shell to provide a magnet roll. The magnets 21, as indicated in FIG. 2, present alternate magnetic poles around the inner surface of the sleeve 19. The magnet roll shown includes eight magnet sectors 21. A doctor blade 22 is provided. It extends from a wall of the hopper 18 to within a short distance of the outer surface of the sleeve 19. Applicators of this type are well known and are commercially available. The sleeve 19 is rotated counterclockwise at a speed to carry sufficient toner powder from the hopper 18 past the doctor blade 22 to the receptor recording member 10. The doctor blade 22 serves to meter the amount of toner powder that is carried by the sleeve 19 toward the receptor recording member 10. When the process requires toner powder to be supplied to the recording gap at the stylus array 16, the sleeve 19 is electrically connected via a switch 25 to a d.c. voltage source 24 of a magnitude sufficient to cause the toner powder to be electrically charged to adhere to the surface of the receptor recording member 10 which then carries the toner powder on receptor 10 to the recording gap by the counterclockwise rotation of the receptor 10. During the time the toner powder moves with the receptor 10 to the recording gap, the charge on the toner powder decreases due to controlled charge leakage into the receptor 10. The toner powder brought to the recording region is acted upon by a magnetic force present at the recording gap to form chain-like aggregates of toner particles on the styli tips which bridge the recording gap. The magnetic force present at the recording gap is provided by magnets 26 and 27 (FIG. 2) which are positioned on opposite sides of the stylus electrode array 16 and extend the length of that portion of array 16 containing the electrodes. The stylus electrodes of the array 16 are selectively supplied via the conductors for the styli indicated at 17 connected to sources (not shown) of recording electrical signals capable of providing voltage pulses of suitable amplitude and duration in accordance with a desired toner powder image. The conductors 17 are grounded except where voltage pulses are supplied. The toner powder is deposited onto the receptor recording member 10 in an image-wise manner opposite the tips of those stylus electrodes to which a recording electrical potential with respect to ground is applied. Such deposited toner powder is viewed a recorded image toner and is bound to the receptor recording member 10 by electrical forces which exceed the magnetic forces in the recording gap. In this sense, this toner is again associated with the receptor recording member 10 and is moved by further rotation of the receptor recording member out of the recording gap, as indicated by the toner powder at 28 (FIG. 2). When a stylus electrode is not supplied with a recording electrical potential it is at ground potential and no toner powder is deposited in the area of the recording surface opposite such electrode, i.e., the toner remains magnetically attracted toward such stylus electrode. The toner chains at non-recording styli do not require replenishment so the incoming supply of toner powder creates an excess of toner. Such excess toner is moved out of the recording gap and out of electronic contact with the toner at the recording gap by the action of magnet 26 and the counterclockwise rotation of a cylindrical sleeve member 29 which encloses the magnet 26 plus the action of magnet 27 and the clockwise rotation of a cylindrical sleeve member 30 which encloses the magnet 27. A cylindrical mounting member is provided for each of the magnets 26 and 27. The magnets are received in grooves formed in the mounting members. A fixed or non-rotating background remover cylindrical sleeve 31 is positioned near the clockwise rotating cylindrical sleeve 30. The background remover also includes a magnetic field producing means that is provided by a rotatable magnet roll 32 (FIG. 2), positioned within the sleeve 30 and adapted for rotation clockwise. The magnet roll 32 provides a magnetic force of sufficient strength at the sleeve member 31 to remove the toner powder that is carried on the cylindrical sleeve 30 as the sleeve 30 moves clockwise as indicated in FIG. 2. The background remover sleeve 31 is also positioned a short distance from the receptor recording member 10 to provide a magnetic force adjacent the receptor 10 that is only of sufficient strength to remove any non-imaging or background toner that may be present on the receptor 10 leaving the image-wise deposited toner 33 (FIG. 2) on the receptor 10. The image toner represented by the toner powder at 33 moves with the receptor recording member 10 as it continues to rotate in a counterclockwise direction. The magnet roll 32 (FIG. 2) structure is similar to the magnet roll provide by the magnet sectors 21 discussed earlier. Six magnet sectors 35 are used for the magnet 32 and present alternate magnetic poles adjacent the inner surface of sleeve 31. Rotation of the magnet roll 32 in a clockwise direction causes the toner powder attracted to the sleeve 31 to move in a counterclockwise direction about the sleeve 31.

Figure 3:
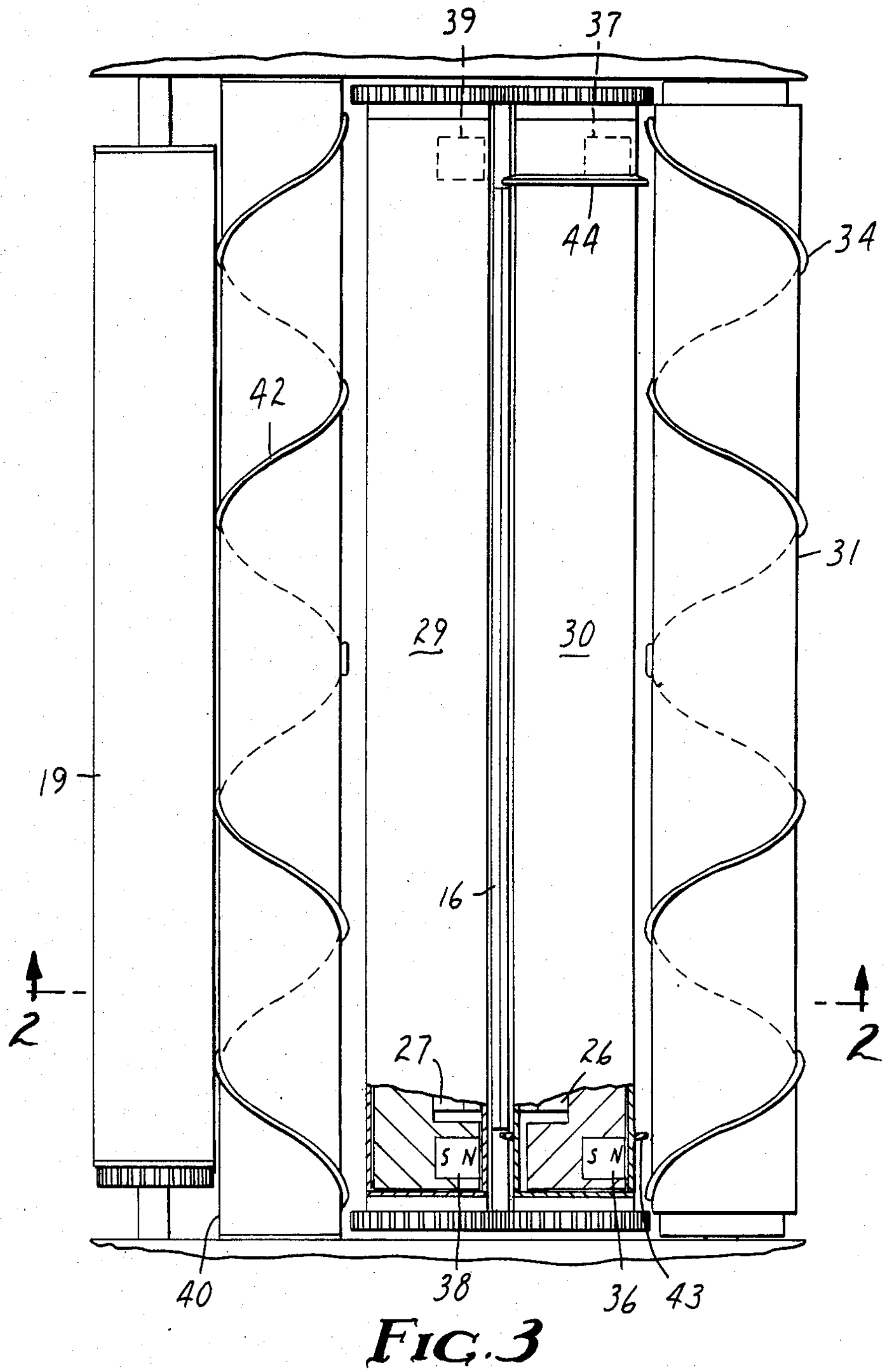
FIG. 3 is a plane view of a portion of the apparatus of FIG. 1 wherein that portion relating to the recording member and its transport is removed.

Referring to FIG. 3, further details relating to the sleeve 31 are shown wherein a dam or flange structure 34 is positioned at its surface. The dam 34 is positioned in a spiral fashion to block the path of movement of the toner powder about the sleeve 31 causing the toner powder to accumulate at the dam 34 and move along the dam 34 to the outer end portions of the sleeve 31. The dam 34 can be formed by braided wire secured mechanically or by an adhesive, such as epoxy, to the sleeve 31 at appropriate points.

It is desirable that the apparatus that has been described provide a toner powder transport means for returning to the toner powder hopper 18 the toner powder that is attracted to the cylindrical sleeve 29 and that which is brought to the end portions of the cylindrical sleeve 31. The additional elements or members that are used to provide this function include four separate magnetic field producing means which can be provided by four small magnets 36–39, a stationary cylindrical sleeve 40 positioned around a magnetic field producing means provided by a magnet roll formed by a plurality of elongate sector magnets 41 (FIG. 2) and a dam or flange structure 42 (FIG. 3) carried on the outer surface of the sleeve 40. The function of returning the toner to the hopper 18 is also aided by the use of two flange members 43 and 44, each in the form of a ring that can be press-fitted to the outer surface of sleeve 30. A toner powder removal blade 45 at the hopper 18 is also provided.

The magnet 36 is carried by the cylindrical mounting member that is provided for the magnet 26 and is mounted so that it is opposite one of the end portions of sleeve 31 to which toner powder is brought in response to the rotation of the magnetic roll 32 and the dam structure 34. A portion of the sleeve member 30 is removed in FIG. 3 to show the positioning of magnet 36. Magnet 37 is similarly positioned within the sleeve 30 at its other end portion and opposite the other end portion of sleeve 31 to which toner powder is brought. The flange member 43 is positioned on the outer surface of the sleeve 30 and is positioned just beyond the side of the magnet 36 that is the farthest from the end of the sleeve 30. The flange member 44 is similarly positioned with respect to the magnet 37. The magnet 38 is mounted on the stylus array 16 side of the cylindrical mounting member provided for magnet 27 at the end portion of the sleeve 29 opposite the end portion of sleeve 30 at which the magnet 36 is located. The magnet 39 is similarly positioned at the other end portion of the sleeve 29. The stationary cylindrical sleeve 40, within which a magnet roll is mounted for rotation, is positioned between the sleeve 29 and the sleeve 19. The magnet roll is provided by eight sector magnets 41 which provide alternate magnetic poles within the sleeve 40. It is adapted for rotation in a clockwise direction as shown in FIG. 2. The flange structure 42 is mounted on the outer surface of the cylindrical sleeve 40 in a manner such that toner powder brought to the sleeve 40, which moves counterclockwise about the sleeve 40 due to the clockwise rotation of the structure provided by the sector magnets 41, is moved to and along the flange structure 42 to the central portion of the sleeve 40. The toner powder removal blade 45 provided as a part of the toner transport means extends from the hopper 18 to the sleeve 40. It serves to remove toner powder brought to the central portion of the sleeve 40 and direct it to the hopper 18 for reuse.

Considering the operation of the toner powder transport structure that has been described, toner powder collected on sleeve 31, that is brought to the end portions of the sleeve 31 due to the rotation of the magnet roll 32 and the dam 34, is attracted to the end portions of sleeve 30 due to the magnetic force provided by the magnets 36 and 37. The flange members 43 and 44, though not essential, are provided to prevent toner from moving inwardly away from the outer end portions of the sleeve 30. The clockwise rotation of sleeve 30 carries the toner powder that is attracted to the end portions of the sleeve 30 to the end portions of sleeve 29 where the magnets 38 and 39 attract the toner powder to the end portion of sleeve 29. The counterclockwise rotation of sleeve 29 carries this toner powder, as well as toner powder attracted to sleeve 29 from the recording region by the magnet 27, to a position opposite the sleeve 40 where such toner powder is then attracted by the magnet structure 41 to the sleeve 40. The toner powder is then carried counterclockwise about the sleeve 40 due to the clockwise rotation of the magnet sectors 41. This action plus the dam structure 42 moves toner powder on the sleeve 40 to the central portion of the sleeve 40. The toner powder brought to the central portion of the sleeve 40 is then removed from that portion of the sleeve 40 by the toner powder removal blade 45 directing the toner powder to the toner hopper 18 where it can then be used again.

While there has been described what is at present considered to be the preferred embodiment of the invention, it will be understood that various modifications may be made therein and it is intended to cover in the appended claims all such modifications as fall within the true spirit and scope of the invention.

I claim:

1. An improved electrographic apparatus for use with magnetically attractable toner powder, the electrographic apparatus including a receptor recording member; a stylus array spaced from the receptor recording member for providing a recording region, the receptor recording member adapted for movement past said stylus array; a hopper for holding a supply of toner powder from which toner powder is provided to the recording region; a magnet disposed adjacent one side of the stylus array establishing a magnetic field at the first electrode to attract toner powder toward the ends of the stylii of the stylus array, the magnet also attracting toner powder presented adjacent the recording region; a first cylindrical sleeve member of non-magnetic material disposed about the magnet and adapted for rotation to carry toner powder attracted toward the magnet away from said recording region; a second cylindrical sleeve member of non-magnetic material with a magnetic field producing means adapted for rotation and disposed within the second cylindrical sleeve member, the second cylindrical sleeve member positioned close to the first cylindrical sleeve member to cause the magnetic field producing means to attract toner powder carried by the first cylindrical sleeve member to the second cylindrical sleeve member and move such toner powder attracted to the second cylindrical sleeve member to at least one end portion of the second cylindrical sleeve member; the improvement including a toner powder transport means for transporting the toner powder from the one end portion of the second cylindrical sleeve member to the hopper, including a magnetic field producing means disposed within and at the end portion of the first cylindrical sleeve member opposite the one end portion of the second cylindrical sleeve member for attracting toner powder from the one end portion of the second cylindrical sleeve member to said end portion of the first cylindrical sleeve member, the rotation of the first cylindrical sleeve member carrying such toner powder away from said last-mentioned magnetic field producing means; a third cylindrical sleeve member adapted for rotation and having an end portion disposed near said end portion of the first cylindrical sleeve member; a magnetic field producing means disposed opposite said end portion of the first cylindrical sleeve member and within said third cylindrical sleeve member for attracting toner powder from said one end portion of the first cylindrical sleeve member to said end portion of said third cylindrical sleeve member, the rotation of said third cylindrical sleeve member carrying toner powder attracted to said last-mentioned end portion away from said last-mentioned magnetic field producing means for further movement by said toner powder transport means to the hopper.

2. An improved electrographic apparatus in accordance with claim 1 wherein said magnetic field producing means disposed within and at the end portion of the first cylindrical sleeve member is a magnet.

3. An improved electrographic apparatus in accordance with claim 1 wherein said magnetic field producing means disposed opposite said end portion of said first cylindrical sleeve member and within said third cylindrical sleeve member is a magnet.

4. An improved electrographic apparatus in accordance with claim 1 wherein said toner transport means further includes a fourth cylindrical sleeve member having a magnetic field producing means adapted for rotation within said fourth cylindrical sleeve member for attracting toner powder to said fourth cylindrical sleeve; said fourth cylindrical sleeve member positioned between the hopper of the apparatus and said third cylindrical sleeve member for attracting toner powder from said third cylindrical sleeve member and a toner powder removal blade positioned between said fourth cylindrical sleeve member and the hopper of the apparatus for removing toner powder from said fourth cylindrical sleeve member for movement to the hopper of the apparatus during rotation of said last-mentioned magnetic field producing means.

5. An improved electrographic apparatus in accordance with claim 4 wherein said fourth cylindrical sleeve member includes a flange member carried by said fourth cylindrical sleeve and spirally disposed thereon for directing to the central portion of said cylindrical sleeve member toner powder that is attracted to said fourth cylindrical sleeve member during rotation of said last-mentioned magnetic field producing means.

6. An improved electrographic apparatus in accordance with claim 4 wherein said magnetic field producing means within said fourth cylindrical sleeve member includes a plurality of magnets that extend axially of said fourth cylindrical sleeve member.

* * * * *